US011394734B2

United States Patent
Hwang

(10) Patent No.: US 11,394,734 B2
(45) Date of Patent: Jul. 19, 2022

(54) DYNAMIC INFERRED SESSIONAL PROXY SERVER SYSTEM

(71) Applicant: Sony Interactive Entertainment Inc., Tokyo (JP)

(72) Inventor: Alex Hwang, Orinda, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 16/688,413

(22) Filed: Nov. 19, 2019

(65) Prior Publication Data
US 2021/0152582 A1     May 20, 2021

(51) Int. Cl.
G06F 15/16     (2006.01)
H04L 9/40      (2022.01)
H04L 67/563    (2022.01)

(52) U.S. Cl.
CPC ........ H04L 63/1425 (2013.01); H04L 63/029 (2013.01); H04L 63/0281 (2013.01); H04L 67/2814 (2013.01)

(58) Field of Classification Search
CPC ............... H04L 63/029; H04L 63/0281; H04L 63/1425; H04L 63/2814
See application file for complete search history.

(56) References Cited

U.S. PATENT DOCUMENTS

2015/0012584 A1 * 1/2015 Lo ................. H04L 67/2814
                                                 709/203
2017/0366635 A1 * 12/2017 Martini ................. H04L 29/06

OTHER PUBLICATIONS

U.S. Appl. No. 16/191,341 to Bhumik Sanghavi et al., filed Nov. 14, 2018 entitled "Video Start-Time Reduction Employing Reductive Edging Principles".
U.S. Appl. No. 16/376,346 to Bhumik Sanghavi et al., filed Apr. 5, 2019 entitled "Bandwidth Usage Reduction Employing Media Treading With Reductive Edging".

* cited by examiner

*Primary Examiner* — Yves Dalencourt
(74) *Attorney, Agent, or Firm* — JDI Patent; Joshua Isenberg; Robert Pullman

(57) ABSTRACT

A method for redirecting data traffic includes receiving a first request from a client device addressed to a first server and sending the first request from the client device to the first server, and determining rerouting rules. A response may be received addressed to client device from the first server the response is sent to the client device. Metadata from client device may be received wherein the metadata provides information about a second request from the client device and a second request from the client device is received addressed to the first server, the information about the second request in the metadata is compared to the rerouting rules and the second request is sent according the rerouting rules.

30 Claims, 10 Drawing Sheets

| Session ID | Sender | Recipient | Content | Redirect | Status |
|---|---|---|---|---|---|
| 1 | 99.12.73.3 | 149.16.202.191 | Media Playlist | 215.181.211.75 | UP |
| 1 | 99.12.73.3 | 149.16.202.191 | Content Playlist | 215.181.211.76 | UP |
| 1 | 99.12.73.3 | 149.16.202.191 | Media Segment | 87.176.105.80 | DOWN |
| 1 | 99.12.73.3 | 149.16.202.191 | Media Segment | 87.176.105.81 | UP |
| 1 | 99.12.73.3 | 149.16.202.191 | CDN URLS | 149.16.202.191 | UP |
| 2 | 99.12.73.3 | 91.142.198.134 | CDN URLS | 91.142.198.134 | UP |

FIG. 8

DYNAMIC INFERRED SESSIONAL PROXY SERVER SYSTEM

FIELD OF THE INVENTION

Aspects of the present disclosure are related to network communication and cloud computing. More specifically aspects of the present disclosure are related to operation of network proxy servers.

BACKGROUND OF THE INVENTION

In general, proxy servers (also called proxies) receive requests from one device over a network and send the request to a second device through the network. Proxy servers are used for many purposes including anonymity, load balancing, functional configuration, or security. Some very common types of proxies are tunneling proxies, forward proxies and reverse proxies.

A tunneling proxy receives an addressed request and sends the addressed to the addressed location with the contents of the request unmodified. Tunneling proxies are also called gateways and are typically used for anonymity and security. Tunneling proxies can be used to hide the location of the requestor.

A forward proxy receives requests from multiple different devices on a private network and sends them to a public network. Responses received from the public network are directed to the correct device on the private network. Outside the private network, it appears that all requests are coming from the private server. Forward proxies are typically used for security and can be set to limit the communications received and sent from devices on private network to devices on the public network.

A reverse proxy receives a request addressed to the proxy from device and sends the request to one or more other devices that were not originally addressed. The reverse proxy may act as a front end for services by collecting requests and redirection the requests to the proper resource location. Additionally reverse proxies are used often used as for load balancing by sending requests to multiple devices based on a load metric. Reverse proxies operate on a fixed set of instructions for where to forward requests. These instructions usually cannot be updated or change during operation and the proxy server session must be shut down and restarted.

Additionally, proxies generally operate on addresses or on requests addressed to the proxy server itself. Currently there is no way for a proxy server to distribute requests to network devices based on the content of the requests when the requests are addressed to other devices on the network. It is within this context that aspects of the present disclosure arise.

BRIEF DESCRIPTION OF THE DRAWINGS

Aspects of the present disclosure can be readily understood by considering the following detailed description in conjunction with the accompanying drawings, in which:

FIG. 8 depicts an example of session dependent rules in a rules table according to aspects of the present disclosure.

DESCRIPTION OF THE SPECIFIC EMBODIMENTS

Figure 1A:
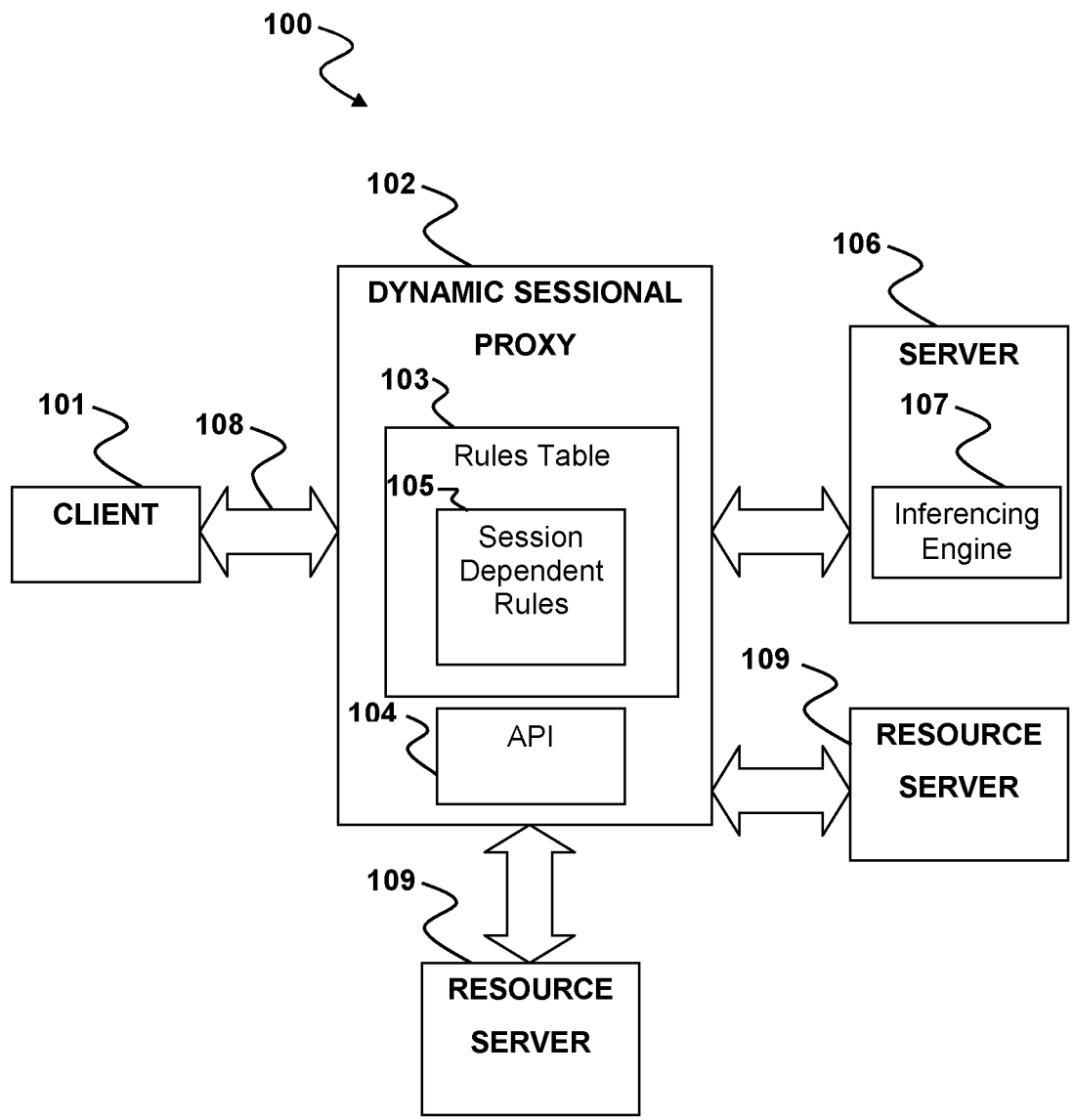
FIG. 1A is a block diagram depicting a simplified dynamic inferred sessional redirection system layout according to aspects of the present disclosure.

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Introduction

Conventional proxies are configured using a static configuration file that is loaded at runtime. To change the configuration, the proxy must be terminated, reconfigured, and then restarted with the new configuration. Implementing a dynamic proxy, i.e., one that can be reconfigured without stopping and restarting it, requires some way to communicate configuration changes to the proxy while it is running. According to aspects of the present disclosure, a dynamic proxy includes an application programming interface (API) that allows the proxy to be reconfigured at runtime. The API provides a dynamic proxy a way for the outside world to tell it how it needs to be configured and a set of rules telling it how to route requests.

A proxy maintains a table of rules and looks at incoming traffic to see if any of it matches any of the rules in the table and then enforces the rules on rerouting the traffic according to the rules that match. In a dynamic proxy, according to aspects of the present disclosure, the table of rules can be altered dynamically, i.e., without having to restart the proxy. To implement this, the table has an alterable structure that can encode the rules, Such a dynamic proxy has to coordinate and synchronize the changing of the rules (writing) with the reading of the rules. This is sometimes known as a concurrency control or access synchronization problem. Solutions to this problem may involve, e.g., putting locks on reading during writing and vice versa.

Aspects of the present disclosure include implementations in which a dynamic proxy can do inferencing. As is generally, understood, inferencing refers to the fundamental ability to infer from a set of premises. In the specific context of aspects of the present disclosure, inferencing involves determining rerouting rules for data traffic from the context of the traffic. However, even with inferencing capability a simple dynamic proxy cannot treat multiple sessions differently. A traditional proxy server generally applies one set of rules to all sessions.

In computer science and networking in particular, a session is a temporary and interactive information interchange between two or more communicating devices, or between a computer and user (see login session). In a client/server situation, a session may be regarded as a conceptual sequence of requests that is understood between a client and a server.

A session is established at a certain point in time, and then 'torn down'—brought to an end—at some later point. The nature of establishment of a session is application dependent. As an example, in a video streaming context, a request to play a different media triggers a new video playback session. An established communication session may involve more than one message in each direction. A session is typically stateful, meaning that at least one of the communicating parties needs to hold current state information and save information about the session history in order to be able to communicate, as opposed to stateless communication, where the communication consists of independent requests with responses. Communication Transport may be implemented as part of protocols and services at the application layer, at the session layer or at the transport layer in the OSI model.

Application layer examples of sessions include, but are not limited to HTTP sessions, which allow associating information with individual visitors and telnet remote login sessions. Session layer examples include, but are not limited to Session Initiation Protocol (SIP) based Internet phone calls. Transport layer examples include TCP sessions, which sometimes referred to as TCP virtual circuits, TCP connections, or established TCP sockets.

In the case of transport protocols that do not implement a formal session layer (e.g., UDP) or where sessions at the application layer are generally very short-lived (e.g., HTTP), sessions are maintained by a higher level program using a method defined in the data being exchanged. For example, an HTTP exchange between a browser and a remote host may include an HTTP cookie which identifies state, such as a unique session ID, information about the user's preferences or authorization level.

According to certain aspects of the present disclosure, a dynamic proxy may additionally include a sessional capability. A dynamic sessional proxy needs capabilities in addition to the above-described capabilities for a dynamic proxy. A traditional proxy looks at a URL in an item of data traffic and determines from that where to go from there. A sessional proxy needs to know the context for the data traffic, e.g., whether it is for live television or video on demand (VOD), whether the traffic originals from the East Coast or the West Coast, etc. A sessional dynamic proxy needs to look to at more information relevant to a session than just a URL. Such sessional information for one session does not necessarily apply to other sessions.

For a sessional proxy, the rules in the rules table must reflect the differences between sessions. A sessional proxy must be able to distinguish between different sessions. Although there are known ways to track sessions on the internet, e.g., by passing cookies back and forth, proxies have not had to use them before.

According to aspects of the present disclosure, a dynamic inferred sessional proxy server system allows a proxy server to be reconfigured without the proxy session having to be restarted. Further, a dynamic inferred sessional proxy allows the proxy server redirect requests based not only on the address for the request but also on the contents of the request. These two aspects allow for a proxy server that can re-route traffic on the fly and intelligently forward requests to their proper recipients without having to create a new proxy.

EXAMPLES

FIG. 1A depicts a dynamic inferred sessional redirection system according to aspects of the present disclosure. A client device 101 may be in contact with a dynamic proxy server 102 over a network 108. The client device 101 may communicate with a server 106 through the proxy server 102. The Server 106 may be a master server having an inference engine 107 configured to inference rerouting rules from data traffic from a context of the data traffic. By way of example, and not by way of limitation, the inferencing engine may be configured to infer application-dependent rules, i.e., rules for which the relevant context is an application associated with the data traffic. For example, for video stream traffic, the inferencing engine 107 could infer rules based on whether a user has turned on closed-captioning, a sleep timer, etc. According to other aspects of the present disclosure, the inferencing engine 107 could be configured to infer session-dependent rules, i.e., rules for which the relevant context is a session associated with the data traffic.

Resource servers 109 may also be available to the client device 101 over the network through the dynamic proxy 102. The dynamic proxy 102 includes a reconfigurable routing rules table 103 and an application programming interface (API) 104 that allows changing the rules table without having to restart the proxy 102. A proxy usually concentrates on routing and is less likely, for example, to maintain inferencing rules. If it did, it could be regarded as a 'master server' as well.

The rules table 103 may be implemented in a memory, or portion of memory, that can be dynamically changed, e.g., cache, Random Access Memory (RAM), dynamic random access memory (DRAM) static random access memory (SRAM), or flash memory. Alternatively, the rules table 103 may be implemented in storage and may be written and rewritten or appended to, in storage, dynamically, and loaded into memory for use. The proxy server 102 may reroute requests from the client device 101 based on session-dependent and/or application-dependent rerouting rules 105 in the rules table 103. For example, a request directed to the server 106 may be rerouted to one or more of the resource servers 109.

The API 104 may change or update the rules table 103 during the operation of the dynamic proxy server 102. The API may suspend updates or changes to the rules table 103 while the proxy server 102 handles requests from the client 101. This ensures that the proxy server 102 maintains consistent behavior during operation and no requests are dropped due to an incomplete or otherwise corrupted rules table 103. Additionally the API 104 may be configured to encrypt or encode the rerouting rules 105 to protect against unwanted tampering. In this embodiment, the API 104 may decrypt the rerouting rules 105 edit the rules and re-encrypt the rules during operation.

The master server 106 may apply updates or changes to the session dependent rules 105 through the API 104. The Inference engine 107 may be used to determine session dependent rules for the client 101. The session dependent rule determined by the inference engine 107 may be sent from the master server 106 to the Dynamic Sessional Proxy 102. The Dynamic sessional Proxy 102 may update the sessional dependent rules 105 using the API 104. The session dependent rules 105 may redirect a request from the client device 101 to a more optimal server 108 than the master server 106 as determined by the session dependent rules.

Additionally the client 101 may send requests to several different servers 109 through the same Dynamic Sessional Proxy 102 instance. The Dynamic sessional proxy 102 may handle the connection between master server 106, servers 108, and other servers 109 through multiple sessions in the rules table 103. Each session may have separate session dependent rules sets 105. The session dependent rules 105 may also keep track of client requests that are redirected for more optimal performance.

Figure 1B:
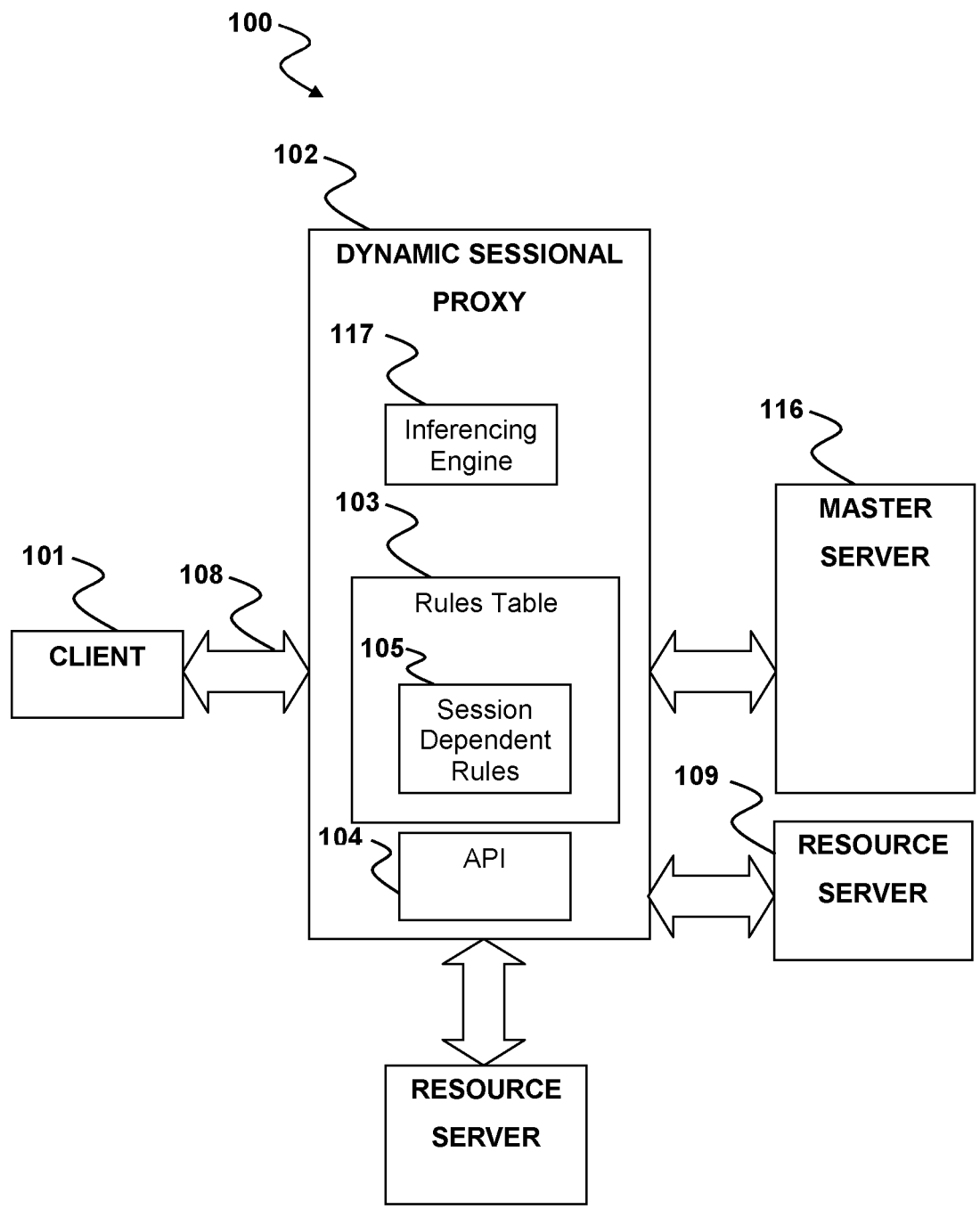
FIG. 1B is a block diagram depicting an alternative simplified dynamic inferred sessional redirection system layout according to aspects of the present disclosure

FIG. 1B depicts an alternative embodiment Dynamic sessional redirection system of the present disclosure. In the shown embodiment, the inference engine 117 has been moved from the master server 116 to the Dynamic Sessional Proxy server 112. The Dynamic Sessional Proxy 112 may analyze the contents of the request sent through the Proxy using the inference engine 117. The Inference engine may look at many different factors in the request to determine the session dependent rules 105 for the current session with the client 101. Once session dependent rules have been determined, the API 104 may be used to update or change the rules table 103 with the appropriate session dependent rules 105.

Figure 2:
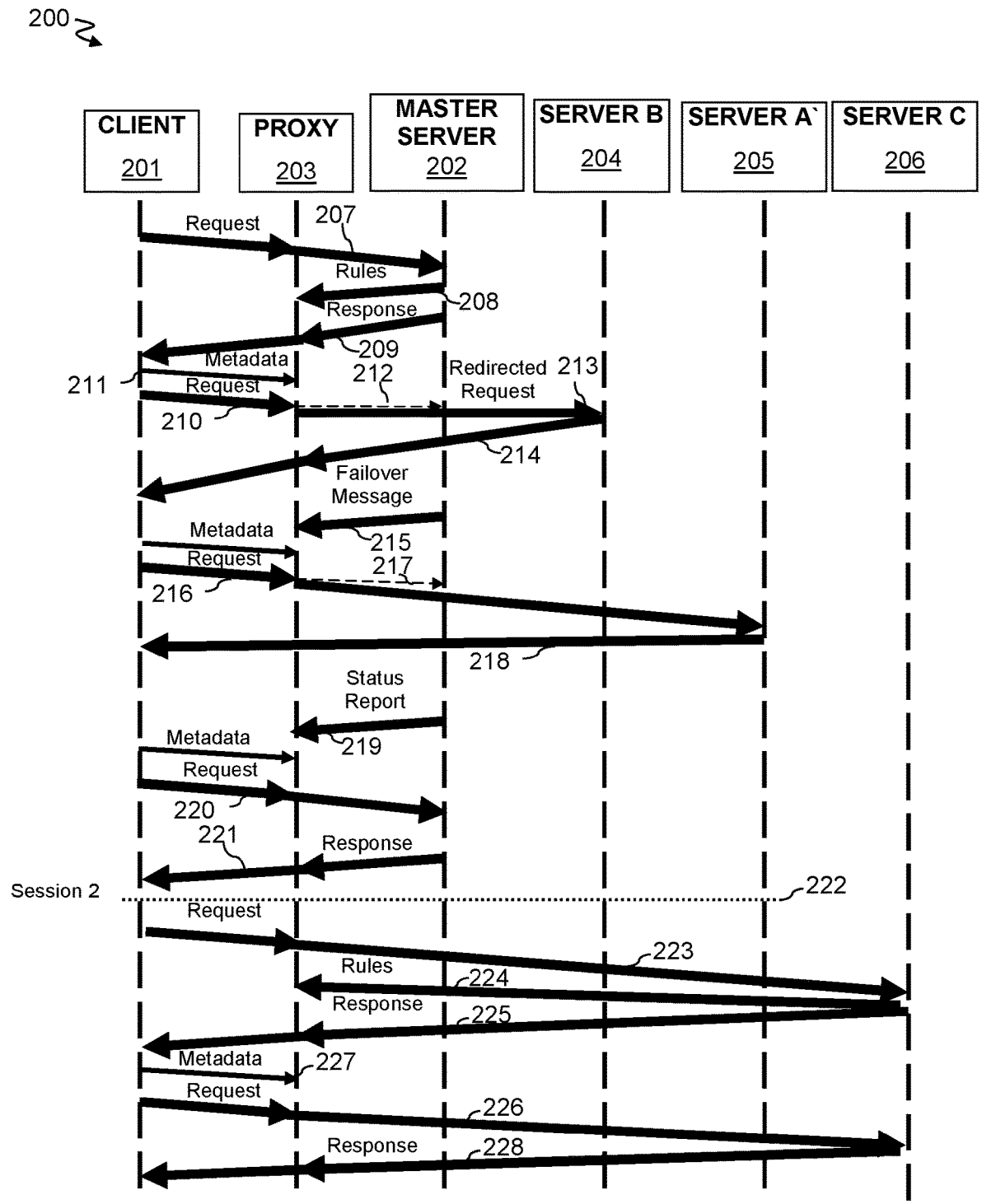
FIG. 2 depicts a connection-timing diagram for dynamic sessional redirection according to aspects of the present disclosure.

FIG. 2 depicts a connection-timing diagram for dynamic sessional redirection according to aspects of the present disclosure. A client device 201 may be in communication with a master server 202 through a dynamic sessional proxy server 203 as well as several other servers 204, 205, 206. The client 201 may send a request 207 to the Master server 202 through the Dynamic Sessional Proxy Server 203. In the first instance, the Dynamic Sessional Proxy Server 203 may act as a tunneling proxy and receive the request 207 and send the request 207 unaltered to the master server 202. The master server 202 may analyze the request 207 to infer information about the request and the needs of the client. From the analysis and inference, the Master server 202 may determine a session dependent rule set. The session dependent rule set may for example and without limitation optimize response times for requests sent by the client, provide appropriate resource locations for client requests or balance loads for resource servers. Furthermore, the session dependent rule set may provide, e.g., different perspective, different authorization, or different content presentation depending on the inference. The Master server 202 sends the session dependent rules 208 to the proxy server 203 where the rules table in the proxy server is dynamically changed or updated with the session dependent rules using the API as discussed above.

The Master server 202 may respond to the request sent by the client 201 with the requested resources 209 through the proxy server 203. The Proxy server 203 may receive the resources and forward the resources 209 to the client.

During the course of communication, the client 201 may send another request 210 for a resource to the master server 202 through the Dynamic Sessional Proxy 203. The Dynamic Sessional Proxy 203 may use contextual information to alter the response to the request 210. By way of example, and not by way of limitation, the Dynamic Sessional Proxy 203 may receive metadata 211 before receiving the request 210 from the client 201. The metadata 211 may be for example and without limitation, a separate file sent to the proxy 203 or may be additional data sent with the request or data in the header of the request. Additionally the metadata 211 may be a cookie, information included in a header or some other small file type. The Dynamic Sessional Proxy 203 may examine the metadata 211 and compare the metadata information to the sessional dependent rules in the rules table. The metadata may be used, for example and without limitation, to look up a server to redirect data traffic to, based on the contents of the request. Alternatively, the metadata may be for example and without limitation, used to look a redirection based on network conditions, client device capabilities, request importance, or request type.

Once the redirection rules specific to the request are determined from the metadata the dynamic sessional proxy may redirect or forward the request to another server. As shown the original recipient addressed in the request 212 is the master server 202. The redirection rules on the dynamic sessional proxy 203 have specified that the request 210 should be sent to server B 204 instead. Thus, the dynamic sessional proxy 203 sends the request to server B 204.

Server B 204 receives the redirected request 213 and processes the necessary response to the request. Server B 204 may then send the requested resources 214 to the client 201 through the dynamic sessional proxy 203. In some embodiments, the dynamic sessional proxy 203 may alter the address information of the resource 214 to ensure that the client 201 recognizes the resources as the requested resources. The dynamic sessional proxy 203 may then send the requested resource 214 to the client. A proxy generally would alter some information in a response from the 'origin' of the requested resource 214 so the client 201 can recognize it was sent from the expected 'origin'. Proxying process is usually transparent to the client 201. The client does expect the response to come from an address in the request. If the Dynamic Session Proxy 203 retrieves the requested resource 214 elsewhere, it must still present the resource as if it was from the address expected by the client 201.

The dynamic sessional proxy 203 may also implement failover redirection capability. The proxy server 203 may receive a failover message 215 from the Master Server 202. The failover message server may notify the proxy server that a server, such as the Master Server is down. Additionally the fail over message may contain information about action for the proxy server to take for example and without limitation; the fail over message 215 may include redirection rules for the proxy server. The proxy server my use the redirection rules in the failover message to change or update the sessional dependent rules in the rules table. To prevent undesirable behavior the proxy server may wait to change or update the sessional dependent rules until after communications between the proxy server and clients and/or other servers has ceased. To this end, the server may put a lock or mutex flag on the sessional dependent rules until communication between proxy server and clients or other servers has ceased. Alternatively the dynamic sessional proxy may already have failover rules in the rules table which may have been originally been provided by the inference engine or a previous failover message.

When a request 216 addressed to a down server 217 is received the proxy server 203 may use the session dependent rules to redirect the request to a backup server, server A' 205. The dynamic proxy server may then send the request 216 to the backup server A' 205 according to the session dependent rules. Additionally the proxy 203 may use metadata to better determine redirection. By way of example and not by way of limitation, there may be several back up servers listed in the session dependent rule and the proxy may choose the appropriate backup server based on latency information and a latency threshold. In other implementations, there may be, for example and without limitation, several backup servers containing different resources. The proxy 203 may use the metadata to choose the correct backup server based on the content of request. The backup server A' 205 may send the requested resource 218 back to the client 201 through the dynamic sessional proxy 203 in response. When the proxy 203 receives the requested resource, it forwards the resource to the client 201. The proxy 203 may alter elements of the requested resource so that the client device recognizes it. For example and without limitation the proxy server may edit the origin address of the requested resource to match the server 202 the request 216 was addressed.

When the down Server 202 comes back on line, it may send a status message 219 to the dynamic sessional proxy 203. The status message 219 may include for example and without limitation new redirection rules that include the previously offline Server 202 as available to send resources to clients. In alternative embodiments, the status message 219 may be used to alter sessional dependent rules in the rule table for example and without a limitation, a box in a column of the session dependent rules table may be altered. After the status message 219 a subsequent request 220 sent by the client 201 may be redirected according to the new redirection rules created by the status message. As shown, the proxy forwards the request 220 to the Master server 202 after the status report 219 indicates that the Master server is back online. After receiving the request, 220 the Master server 202 may respond by sending the requested resource back to the client 201 through the proxy 203, which forwards the requested resources 221 to the client 201.

One benefit of certain aspects of the present disclosure is that of reduced memory footprint. Sessional dependent rules may be established or removed during operation and, as such, in some implementations the rules table may require session dependent rules for only the clients communicating through the session dependent proxy. Failover rules and other connection rules are not required to be present on the session dependent proxy at start up and may be added using the inference engine and API when the additional rules become needed. At startup, the dynamic sessional proxy may maintain a set a default rules in the rules table before the sessional dependent rules are changed or updated. For example and without limitation the dynamic sessional proxy may maintain a set of rules in the rules table that enable the dynamic sessional proxy to act as a tunneling proxy without sessional dependent rules.

The sessional dependent proxy may handle multiple proxy sessions in one instance. That is, the sessional dependent proxy may allow a client to connect to multiple servers or server instances through the proxy without creating a new proxy server instance. For example and without limitation a client may be running for video on demand (VOD) such as H.264 streaming video and be in communication with .264 streaming video content servers over the network through the proxy. For example and without limitation a client is watching a VOD movie and decides to check on a live stream of a sports event. A client may activate a picture in picture functionality for HTTP Live streaming video application (HLS) the same dynamic sessional proxy server handling the VOD stream may also handle the HLS stream simply by starting another session.

As shown, the client 201 may begin a second session 222 in communication with the dynamic sessional proxy 203. The client 201 may begin a new session 222 by requesting communication with another server 206. Alternatively, the client may begin a new session by sending message to the proxy indicating a new session instance. The client 201 may send a request 223 to another server 206 through the proxy 203. The proxy 203 may initially act as a tunneling proxy and simply forward, the request to the server 206 unaltered. In other embodiments, the proxy may intercept request and use an inference engine to determine the best sessional dependent rules to handle the request.

In some implementations, upon receipt of the request the server 206 may use an inference engine to determine the streaming requirements of the client 201. The inference engine may generate session dependent rules for the client and the session. These session dependent rules may be sent 224 to the proxy server 203 where the API may update or change the rules table to include the received session dependent rules. Subsequently or concurrently, the server 206 may send the requested resources 225 to the client 201 through the proxy 203. The Proxy may receive the requested resources and forward the requested resources 225 to the client 201 unaltered. Additionally the requested resources may include information that enables metadata to be sent from the client to the dynamic sessional proxy 203.

The client 201 may continue sending requests 226 through the dynamic sessional proxy 203 with metadata 227. The proxy may use this metadata to determine the session for communication and for determining the optimal routing. In some embodiments, the metadata may include for example and without limitation, a session identification number. The proxy 203 may receive the request from the client 201 and forward the request 226 to the server 206 according to the session dependent rules in the rules table. Subsequently the server 206 may send the requested resource 228 to the client through the proxy 203 and the proxy may forward the requested resources to the client 201.

According to additional aspects of the present disclosure, the dynamic sessional proxy 203 may act as reductive edger for the client. The problem, referred to herein as the "edging" problem is how to make cross-platform clients of different capabilities equally capable at accessing contents hosted by a content delivery network (CDN). Edging is a commonly understood term in cloud computing where a cloud application tries to handle the edge of cloud better usually to improve performance, e.g., through fault prevention or complexity reduction (e.g., simplifying playlists). Reductive Edging architecture provides edge intelligence in a component external to client devices or client applications so the client can capably use advanced edging technology without having to radically reconfigure a client device or application. Reductive Edging techniques relieve client devices and applications of edging and robustness responsibilities allows them to perform well at simpler tasks.

By way of example, and not by way of limitation, the proxy server may perform reductive edging techniques such as pre-caching server location and media segments based user's consumption habits. Consumption habits of the user may be tracked by the proxy server or other resource servers on the network and used to determine likelihood a client device to view a particular media segment. Additional examples of reductive edging techniques may be found in co-pending application Ser. No. 16/191,341 to Sanghavi et al. entitled "VIDEO START-TIME REDUCTION EMPLOYING REDUCTIVE EDGING PRINCIPLES" and co-pending application Ser. No. 16/376,346 to Sanghavi et al. entitled "BANDWIDTH USAGE REDUCTION EMPLOYING MEDIA TREADING WITH REDUCTIVE EDGING" the contents of both which are incorporated herein by reference.

Figure 3:
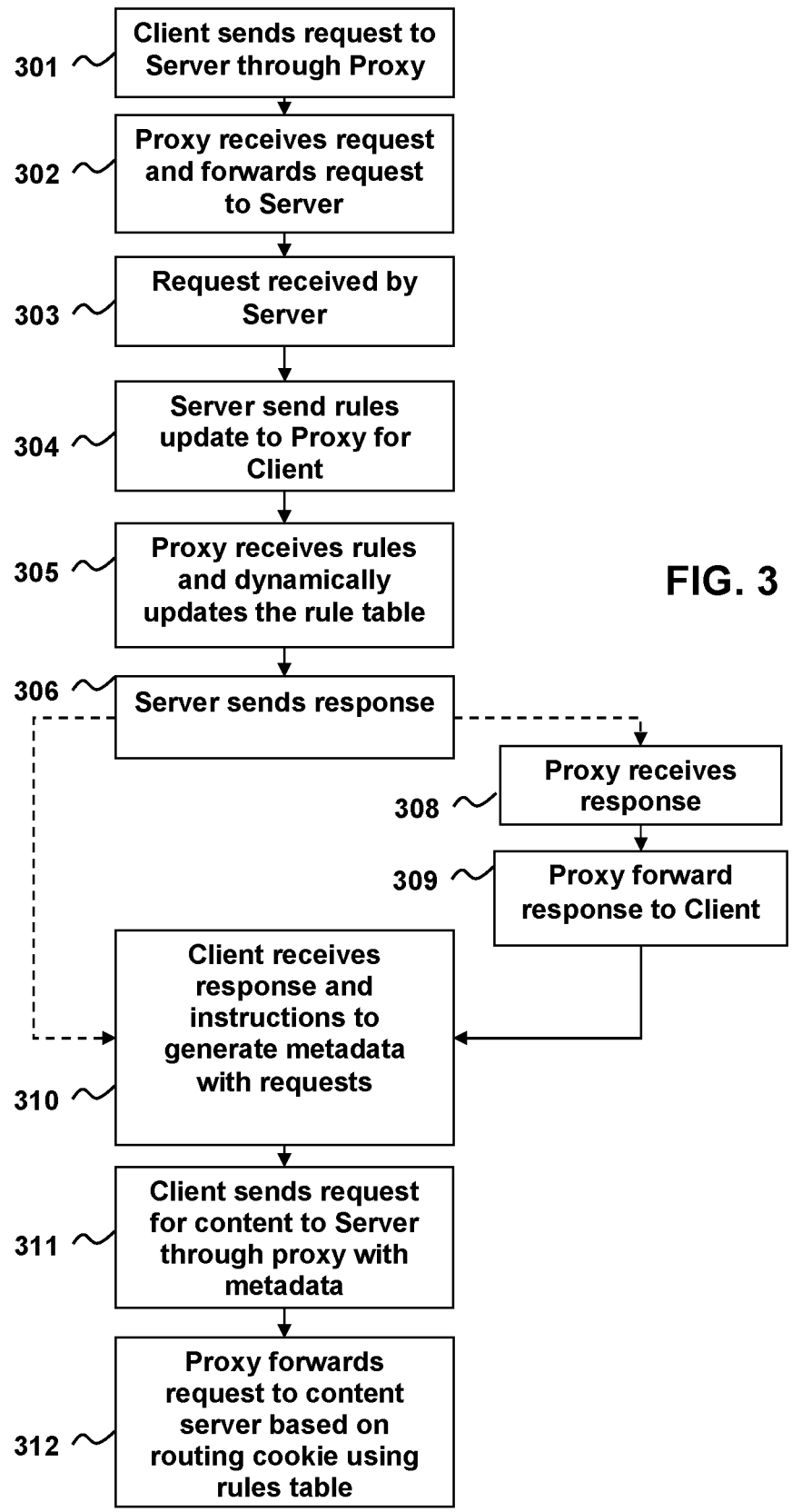
FIG. 3 is a flow diagram showing the overall method for dynamic sessional redirection according to aspects of the present disclosure.

FIG. 3 shows a flow diagram of an overall method for dynamic sessional redirection according to aspects of the present disclosure. A first session for a dynamic sessional proxy may begin with the client sending a request for a resource to a server through the proxy as indicated at 301. The proxy may generate a new session for the client upon reception of the request as indicated at 302. Additionally as this is the first request, in the session, the proxy may act as a tunneling proxy and forward the request to the addressed server unaltered. Alternatively, the proxy may decode the request and examine the request with an inference engine to determine the requirements of the client for this communication session.

The server may receive the request as indicated at 303. After receiving the request, the server may decrypt, examine the request and use an inference engine to determine the sessional dependent rules for the communication session with the client. The server then sends the sessional dependent rules to the dynamic sessional proxy server, as indicated at 304. The proxy server receives the rules and using the API the proxy server dynamically updates or changes the sessional dependent rules in the rules table as indicated at 305 without having to restart.

Figure 4:
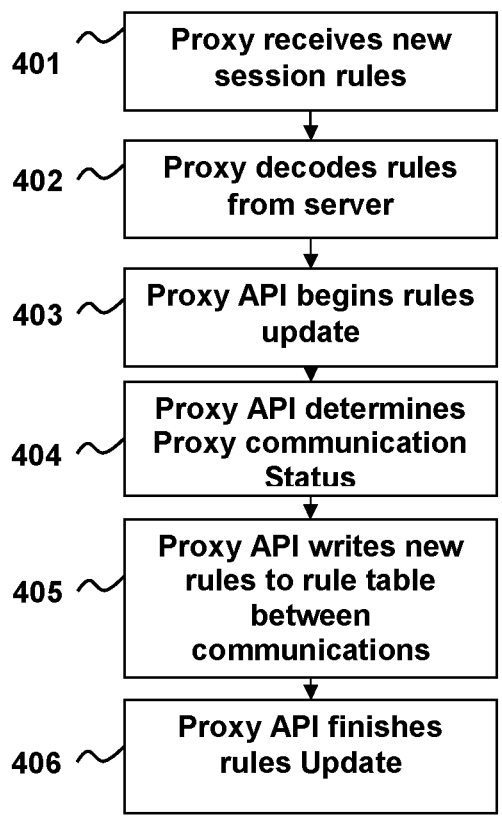
FIG. 4 is a flow diagram depicting the changing or updating the proxy server with session dependent rules from an inference engine according to aspects of the present disclosure.

FIG. 4 is a flow diagram depicting the changing or updating the proxy server with session dependent rules from an inference engine according to aspects of the present disclosure. The dynamic sessional proxy may receive a new or changed set of sessional dependent rules at 401 from either an inference engine located on the dynamic sessional proxy itself or an inference engine on a separate server such as a master server. The sessional dependent rules may be encrypted, encoded or otherwise in a form not useable by the API for the rules table as such, the sessional dependent rules may be decoded at 402 to place them in a useable form.

After decoding, the API may prepare to update the rules table with the new sessional dependent rules at 403. The API may format the sessional dependent rules to a suitable form for the rules table as well as add information to the new sessional rules necessary for the operation of the proxy server. Before updating the rules table, the API may check the communication status of the proxy to determine if there are any pending communications in the session between the proxy server and the client or the proxy server and other servers at 404. If there are pending communication that is a response or request is at the proxy and waiting to be forwarded, and then the API will post-pone updating the rules table until the pending communication has been cleared. Once all pending communications have been cleared, the API may write the sessional dependent rule set to the rules table at 405, without having to restart the proxy. In some embodiments and without limitation, the API may rewrite the entire rules table with session dependent rules set. In other embodiments, the API may simply rewrite a portion of the rules table with the session dependent rule set, for example and without limitation, the portion of the rules table corresponding to the session or session identifier of the session dependent rule set. In yet other embodiments, the API may write new entries for the session dependent rule set in the rules table or change an entry in existing session dependent rules in the rules table.

After the rules table is changed or updated with the new session dependent rules the API may finish updating the rules table at 406. The API may finish updating rules table by encrypting the rules table or placing the rules table in a form that is usable by the proxy server for routing operations. Additionally the API may change any dependencies in the proxy server to ensure continued operation of the rules table. For example and without limitation the API may change the entries in a route assignment program where the location for the dependent entry was changed during the update, such as when a new entry is added for a session and subsequent entries in the table are shifted down. The API may change the dependencies of the routing program to match the downward shift.

Additionally there may be a time window for updating the rules table, for example and without limitation, it may take milliseconds to write to the rules table, during these few milliseconds, processing of any received requests may be postponed. Alternatively, while writing to the rules table, the proxy server may postpone processing of communications until the write operation has concluded and the rules table is placed in an operational form. Only parts of the proxying process require accessing the rules tables. The finer grain concurrency control can make the dynamism very efficient.

Referring again to FIG. 3, in implementations where the inference engine is on the server the server may send the resources requested by the client after the session dependent rules are sent to the proxy, as indicated at 306.

The inference engine may look at a myriad of different factors to determine session dependent rules for communication with the client. For example and without limitation the inference engine may receive; network congestion information such as client and server latency, information about the request such as types of media requested and location of servers being accessed, processing power of client and of other servers on the network, and/or importance of the communication. From these myriad of different factors and other a priori information such as server location and stream type requirements the inference engine may develop session dependent rules for communications from the client.

In embodiments where the inference engine is on the proxy or at a different location, the server may send the resources requested by the client as soon as it is prepared for transmission at 306. The resources may be sent through the proxy or sent directly to the client. In the former case, the proxy may receive the response at 308 of the requested resources and then forward the response, unaltered, to the client at 309.

The client device may subsequently receive the response, as indicated at 310. Additionally the metadata about requests sent by the client to the server through the proxy server may not initially be enabled on the client device. In this case, the response may include additional instructions to the client device enable the client send metadata to proxy server about requests.

Subsequent requests by the client device for resources may be sent to the dynamic sessional with metadata about the request and with an end address of the server at 311. The metadata may be sent to the proxy server before the request, contemporaneously with the request or immediately after the request is sent to the proxy server. The metadata may be a small independent file sent proxy server or an entry in an encoded wrapper of the request itself, such as an entry in a file header.

The proxy may receive the metadata and the request and analyze the metadata to determine information about the request. The information about the request may be used to look up session dependent routing rules for the request. These session dependent routing rules are then used to send the request to the appropriate server, as indicated at 312.

Figure 5:
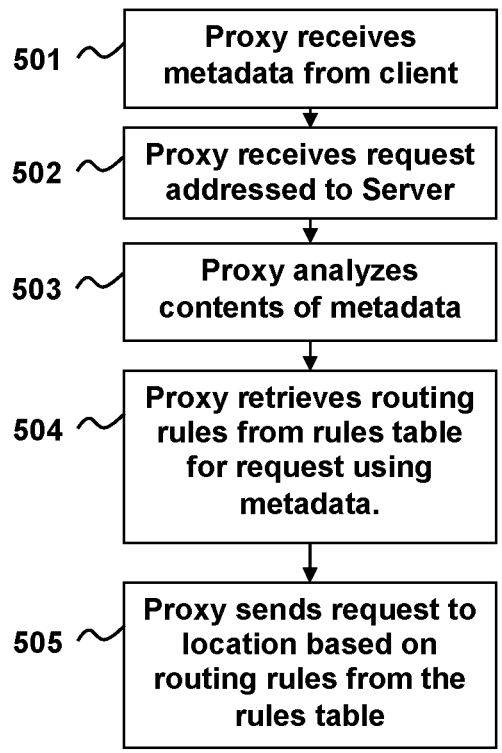
FIG. 5 is a flow diagram depicting a method for dynamic sessional redirection at the proxy server according to aspects of the present disclosure.

FIG. 5 is a flow diagram depicting a method for dynamic sessional redirection at the proxy server. The proxy server may initially receive metadata from a client device before a request, contemporaneously with a request or following a request, as indicated at 501. The proxy server may also receive the request from the client device at 502. The metadata may be encoded for security or size reduction and as such, the proxy may decode the metadata before use. The proxy may analyze the contents of the metadata at 503 to determine information about the request for use with the routing table. The metadata may contain information about the request such as and without limitation the related session identifier, contents of the request, speed of client, latency of the client's network, importance of request, size of the resource requested etc.

The Proxy server then may use the information about the request to determine the appropriate routing instructions from the rules table. The proxy server may retrieve routing instructions from the rules table at 504. In some embodiments, the routing table may be encrypted for security and in which case the proxy server may decrypt rules table before the table is used to determine the appropriate routing instructions. The proxy server may determine the appropriate routing rules for the request by for example and without limitation looking up in the rules table a session ID and a relevant piece of information about the request such as importance from the metadata.

Once the appropriate routing rules have been determined, the proxy server may send the request to the location designated by the routing rules, as indicated at 505. Additionally the proxy server may re-encode the rules table to ensure security.

Figure 6:
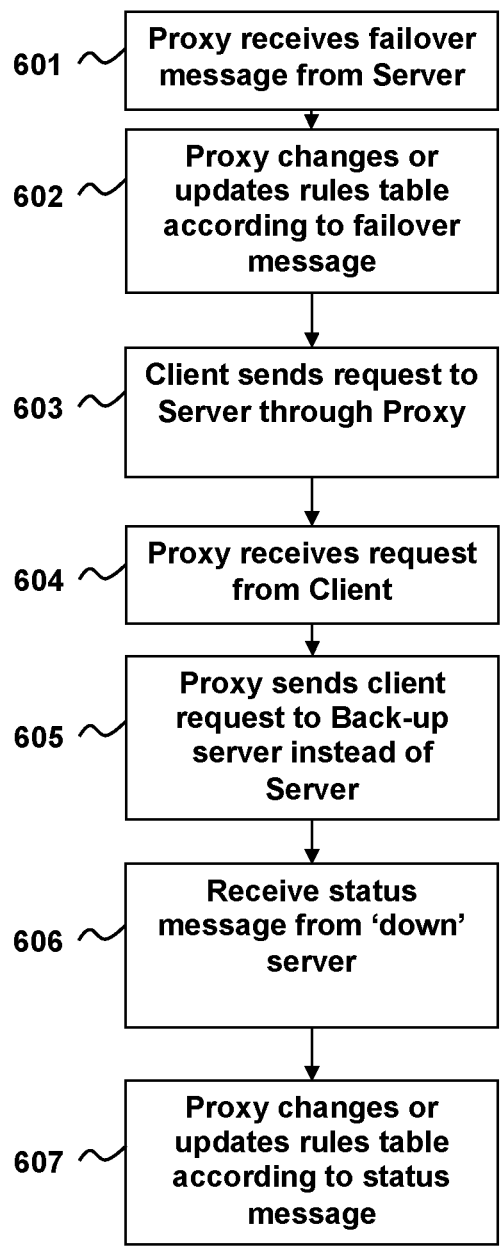
FIG. 6 is a flow diagram showing the method of operation of the dynamic sessional proxy when a server is in a failover state according to aspects of the present disclosure.

FIG. 6 is a flow diagram showing the method of operation of the dynamic sessional proxy when a server is in a failover state according to aspects of the present disclosure. Sometimes servers operating on a network need to be taken offline. When a server is taken offline, it may be configured to send a failover message to the proxy server. The failover message may be received by the proxy server at 601 and used to update or change the rules table. The proxy server API may use the fail over message to change or update the rules table at 602. For example and without limitation the failover message may cause the API to decode the rules table and change entry in the rules table such as changing a status from up to down additionally the API may add a new entry to the sessional dependent rules such as a location to redirect requests addressed to the down server. After changing or updating the session dependent rules in the rules table the API may re-encode the rules table. Subsequently, a client may send a request to a server through the proxy as indicated at 603. In the example depicted in FIG. 6, the proxy receives a request addressed for the 'down' resource at 604. The proxy may decode the rules table and use the altered sessional dependent rules for routing instruction. Thus, the proxy may send the request to a back-up server instead of the 'down' server at 605.

The 'down' server may come back online. The previously down server may be configured to send a status message to the proxy server when it is back online. The proxy server may receive the status message at 606. The proxy server API may decode the rules table and update or change sessional dependent rules in the rules table using the status message, as indicated at 607. For example and without limitation the API may change an entry in the rules tables to indicate that the previously 'down' server is now 'up', additionally the API may delete an entry in the session dependent rules indicating the backup server or may change the rules to indicate that the back-up server is secondary to the now 'up' server. After the API is finished changing or updating the session dependent rules, the rules table may be re-encoded. Subsequent requests sent through the proxy server may be forwarded to now 'up' server instead of the backup server.

Master Server

Figure 7:
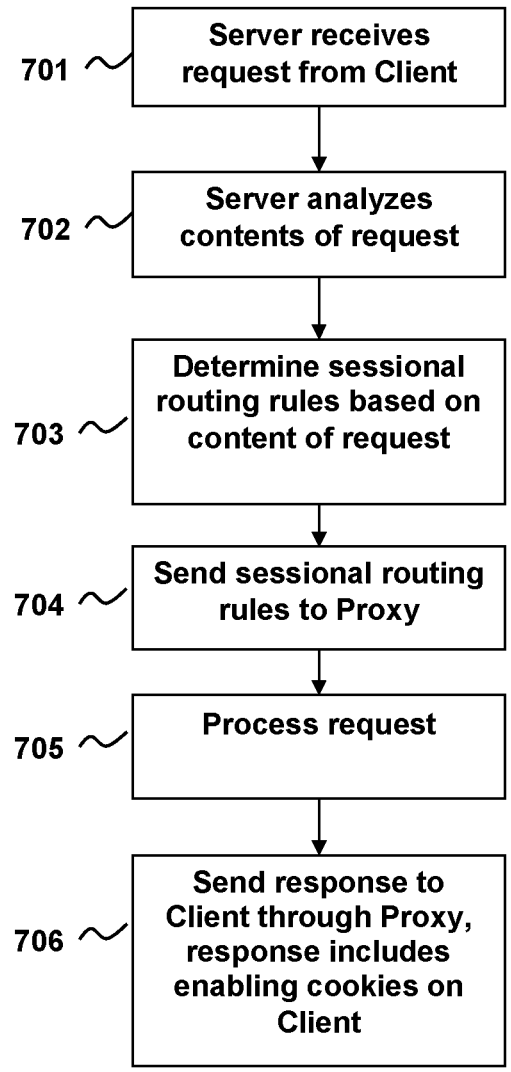
FIG. 7 is a flow diagram depicting a master server side method for Dynamic Sessional Routing according to aspects of the present disclosure.

FIG. 7 is a flow diagram depicting a master server side, method for Dynamic Sessional Routing according to aspects of the present disclosure. As used, herein the term "master server" or alternatively "master", may be used to describe a server in communication with the proxy server and client that maintains an inference engine and communicates sessional dependent rules to the proxy server. A 'master' is generally limited to a domain. For example, suppose an application interacts with game.wondercorp.com and tv.wondercorp.com. The master server for game.wondercorp.com knows intimately about its services and can infer what a proxy needs to do based on information it acquires through interaction with a client during a session. The same client's interaction with tv.wondercorp.com is a different matter. The master server for tv.wondercorp.com knows tv.wondercorp.com very well but may not know about game.wondercorp.com's business. The archtitecture described herein is fairly distributive—a client can interact with many domain masters and many proxy servers; a master could also interact with other masters and many proxy servers.

The master server may receive a request that originated from a client through a dynamic sessional proxy server as indicated at 701. The request may indicate that this is the first instance of communication between the master server and the client. The master server may analyze the contents of the first instance of communication between a client device and the master server with an inference engine to determine sessional dependent rules for the communication session at 702.

According to some additional aspects of the present disclosure the Inference engine, as will be discussed later, may analyze the content of the communication as well as the context of communication. Context of communication may be such things as, without limitation, network congestion, time of day, expected traffic, available servers, maintenance schedules, communication priority, service levels, etc.

From the analysis of the request, the inference engine may determine a set of session dependent rules for communications with the client as indicated at 703. The sessional dependent rules are established for a defined communication session with the client, a communication session may for example and without limitation be a streaming video, live streaming video, video game downloads, web page viewing, streaming audio. After the sessional dependent rules have been determined, the rules are sent to the dynamic sessional proxy server at 704.

After analysis of the request, the server may process the request and generate the requested resource at 705. The master server may process the request by, for example and without limitation pulling a resource from a connected storage or memory. After the request has been processed, the requested resource may be packaged, as a response to the client included in this packaging may be instructions or code that enables metadata to be sent from the client to the proxy server during the communication session. This response may then be sent to the client device at 706. According to some aspects of the present disclosure, the response may be sent back through the dynamic sessional proxy to the client. Alternatively, the master server may send the response directly to the client or through a different proxy server.

Rules Table

FIG. 8 depicts an example of session dependent rules in a rules table according to aspects of the present disclosure. As shown the session dependent rules may be stored in a table format. The session dependent rules may have columns for Session ID 801, the Sender's address 802, the intended Recipient's address 803, the request's content 804, Redirection Location 805 and Redirection Server status 806. While the table shown depicts certain columns the breadth of the disclosure is not so limited, the rules table may have any number of columns to handle the requests made through the proxy.

As shown entries in the rules table are grouped by session ID 801. This feature allows the dynamic sessional proxy to handle multiple different communications at the same time. For example, a client may initiate streaming a video with a server through the proxy. This streaming video may be designated with the session ID 1. Subsequently the client may also decide to watch a live stream video in picture in picture mode while also streaming the video. Ordinarily, a new proxy instance would have to be created for the new live streaming video instance. Here, instead the dynamic sessional proxy uses the session ID 2 to differentiate between the two different communications instead. The session ID also allows the rules table to differentiate between rules for one communication session and rules for another, different communication session.

As shown a in the example rules table of FIG. 8, communications from a client, "99.12.73.3" are directed to recipient Master Server "149.16.202.191" in Session ID 1. The Session ID may be established by the communication protocol, by metadata or by some other indicator of a new session. Additional information about the contents of communication may come from metadata and contextual information such as network reports. Session information may take many forms. By way of example, a client or server may generate a unique ID, or combined client or server IDs, a timestamp, one or more canonical rules that guarantee the uniqueness of a session, and the like. Such session information can be generated during the handshake state of a session.

In the example of FIG. 8 the client may establish communication with a master server for the purpose of HLS video streaming. The client device may direct all of its communications to the master server "149.16.202.191" while there are many different servers on the network that are actually handling the client's request. Metadata from the client device may be used to determine the correct forwarding address for the request. For example, metadata for a request from a client may specify that the request is part of session ID 1and is for a "Media Segment." The server may look up in the table the session ID 1 and the content 804 to determine the corresponding redirection location 805. Here the server would determine from the row 807 that the request may be redirected to "87.176.105.80" Contextual information from the server has indicated that this server is "down" and the rules table is changed to indicate that the server status 806 is "down." In some embodiments of the present disclosure, dynamic sessional proxy may look for the next "up" server when the rules table indicates that a redirection location is down. Here, the proxy would determine that the media segment server in row 808 is up; therefore, the proxy may forward the request from the client to "87.176.105.81" which is the next "up" media segment server.

Additionally the client may decide to begin request additional content from a different server while still communicating in the first session. An example from video streaming would be overlaying a commercial on top of live video. These requests for additional content may be designated as session ID "2." As shown, the proxy may be able to handle requests from session ID "1" and session ID "2" simultaneously by looking up the session dependent routing rules in the rules table.

Inference Engine

As noted above, inferencing refers generally to the fundamental ability to infer from a set of premises. As used herein, the term "inference engine" generally refers to specially configured hardware or software that can make inferences from a set of premises. There are many ways to do inferencing ('inferencing models'). By way of simple example, and not by way of limitation, the inference engine could be a decision tree. A more complex form of inference engine would be a web or graph. Inferencing models can be as simple as, e.g., set of rows in a relational database and inferring with relational calculus or as fancy as, e.g., rule based systems with self-learning capability. Different inferencing models have different strengths and weaknesses and may yield different quality of inference.

Figure 9:
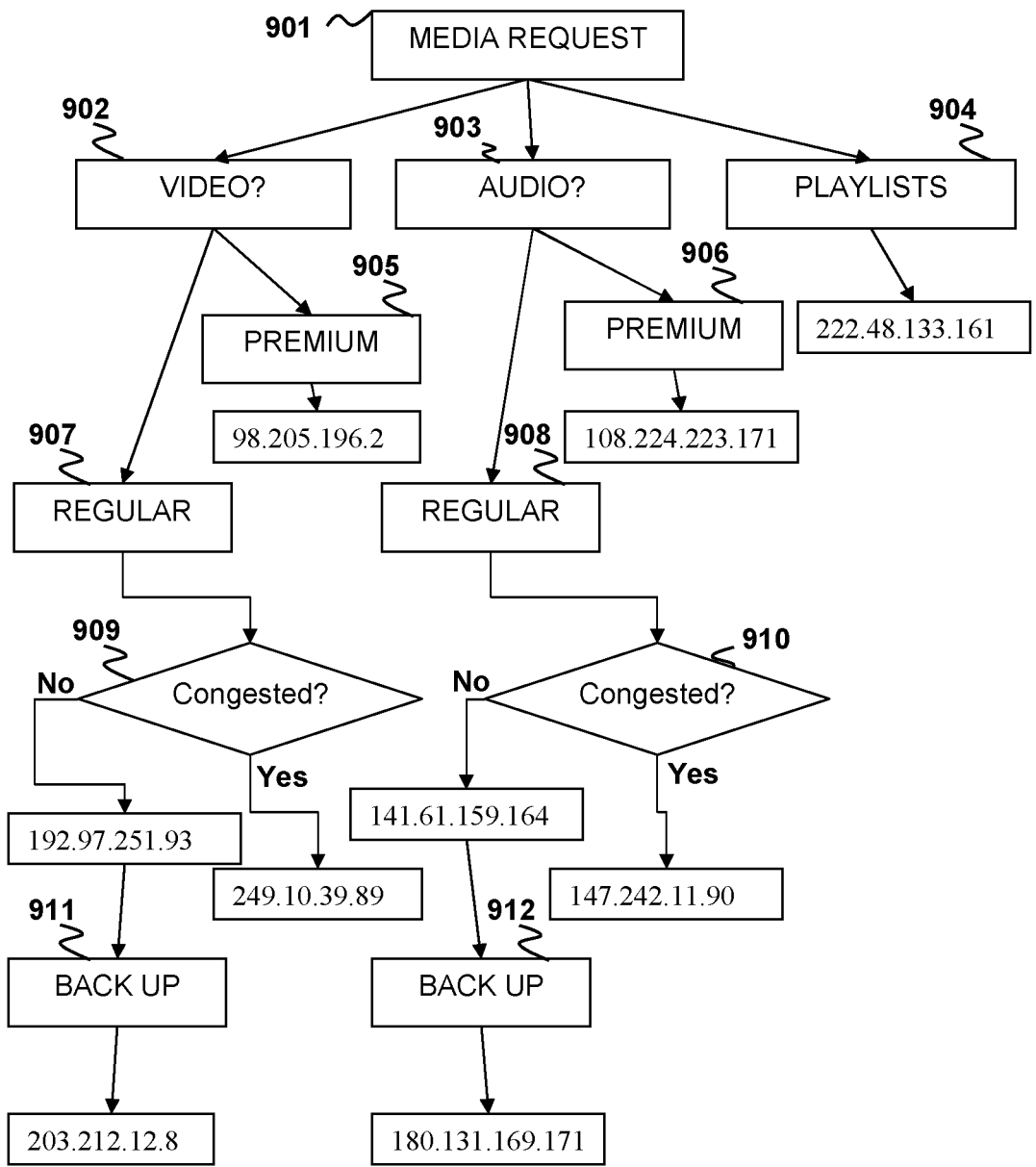
FIG. 9 depicts an example decision tree of an inference engine according to aspects of the present disclosure.

FIG. 9 depicts an example decision tree of the inference engine according to aspects of the present disclosure. The inference engine may use a decision tree 900, to determine session dependent rules for the rules table. As shown for a media request 901 there may Video 902, Audio 903 and playlist 904 components all stored in different resource servers on the network. The media request may indicate that the request is for premium content 905, meaning that the client may have payed extra money for better service. In the example case of premium content 905, 906, the sessional dependent rules may direct the sessional dependent proxy server to forward requests for premium video content 905 to "98.205.196.2" and requests for premium audio content 906 to "108.224.223.171." Playlists may be handled by one server, "222.48.133.161" regardless of whether the request is for premium content. Once the locations of the particular servers have been determined, they may be packaged as sessional dependent rules for this particular communication session. The sessional dependent rules may be formatted as a table similar to the table shown in FIG. 8, identifying the current session number. In other embodiments the rules table may take the form of a text list specifying particular locations within a table for entries. In yet other embodiments, session dependent rules are in the form of routing instructions for the proxy server.

The Inference Engine may also take contextual information to determine sessional dependent rules. For example as shown in in FIG. 9 the inference engine may receive reports on network traffic such as, without limitation, pinging the proxy server, resource servers, client servers etc. to determine response times or resource servers may send server load reports to the master server. In the example shown if the contextual information indicates that the main servers are congested at 909, 910 then the sessional dependent rules may be determined to route video requests to alternative server "249.10.39.89" and audio requests to alternative server "147.242.11.90." In some embodiments when the contextual information shows that congestion on one or more of the servers is reduced the sessional dependent rules may be determined to switch the routing of requests to the normal servers for regular content 907, 908. For example as shown if the contextual information shows that the video resource server 902 is no longer congested, then the sessional dependent rules may be determined to route video requests to the normal regular video resource server "192.97.251.93." Similarly if the contextual information shows that the audio resource server 903 is no longer congested then sessional dependent rules may be determined to route requests to the normal regular audio resource server "141.61.159.164."

The inference engine may also include backup server functionality 911, 912. As shown the sessional dependent rules may also include entries for routing to back servers. These entries may be included with the normal routing instructions or may be determined by the inference engine as a replacement for the normal routing rules. In the example shown the for video 902 routed to the default video resource server "192.97.251.93," backup server routing instructions 911 may also be included in the sessional dependent rules. Similarly, for audio 901 routed to the default audio resource server "141.61.159.164," backup server routing instructions 912 may also be included in the sessional dependent rules.

The inference engine as above described should not be construed to being limited to only the shown features of congestion and premium service as the decision tree layout may be adapted to accommodate many other features such as, specific resource locations, estimated traffic based on time of day, past connection successes from the client, targeted ad selection, failover choices, content amelioration, and the like. Additionally the IP addresses shown in the decision tree of FIG. 9 are merely for illustrative purposes and do not represent addresses or real servers nor are they intended to limit the current disclosure to the addresses listed. It should be understood that a person of ordinary skill in the art could change the example addresses for any address required for the disclosure.

System

Figure 10:
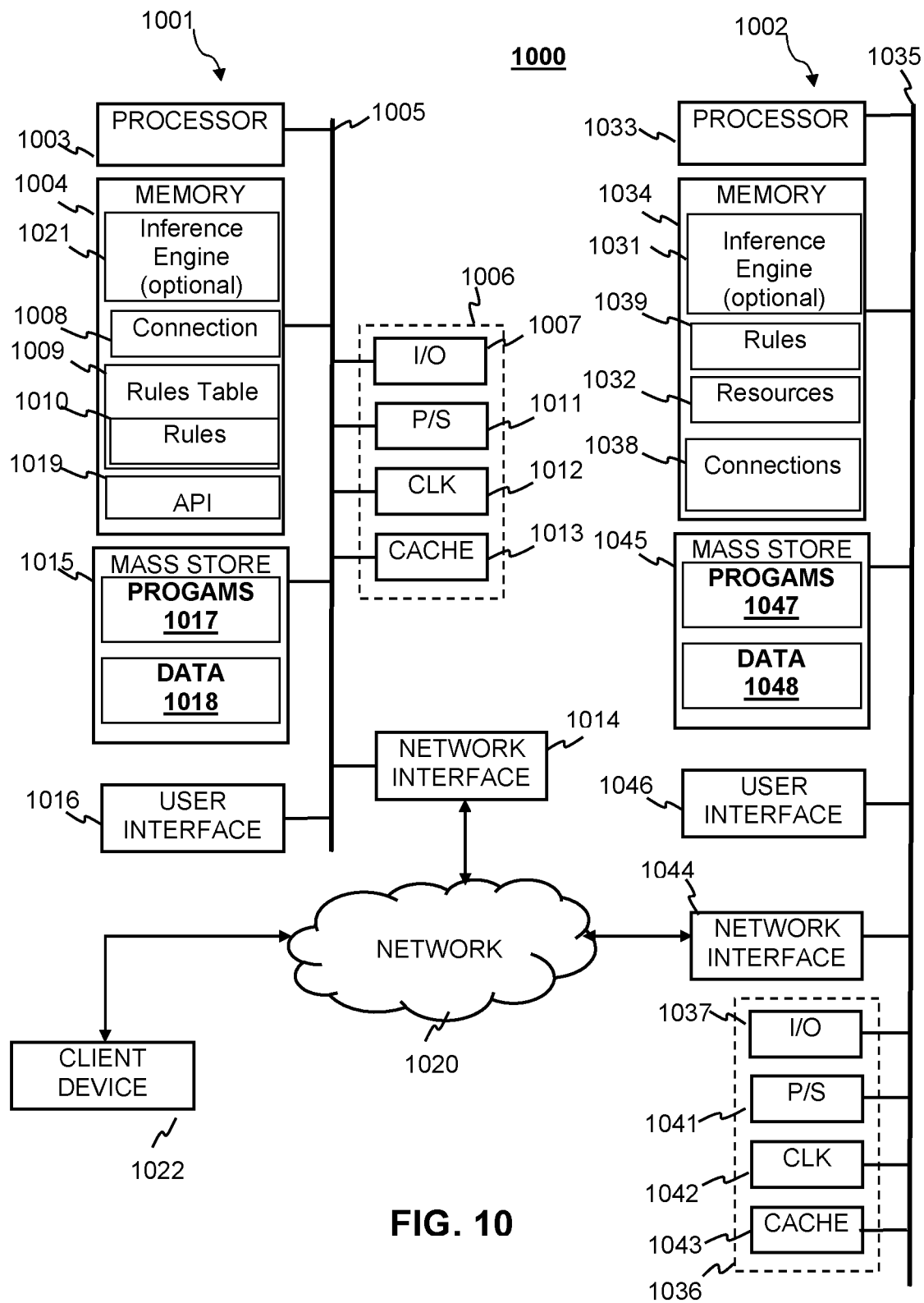
FIG. 10 is a system block diagram depicting a Dynamic Sessional redirection system according to aspects of the present disclosure.

FIG. 10 depicts a Dynamic Sessional redirection system 1000 according to aspects of the present disclosure. The system may include a Dynamic Sessional Proxy 1001 and in some embodiments a Master Server 1002.

The Dynamic Sessional redirection system 1000 may include a Dynamic sessional proxy 1001 having one or more processor units 1003, which may be configured according to well-known architectures, such as, e.g., single-core, dual-core, quad-core, multi-core, processor-coprocessor, cell processor, and the like. The Dynamic Sessional Proxy server 1001 may also include one or more memory units 1004 (e.g., random access memory (RAM), dynamic random access memory (DRAM), read-only memory (ROM), and the like).

The processor unit 1003 may execute one or more programs, portions of which may be stored in the memory 1004 and the processor 1003 may be operatively coupled to the memory, e.g., by accessing the memory via a data bus 1005. The programs may include Network connection programs 1008 and API 1019, which may implement the method described above with respect to FIG. 3, FIG. 4, FIG. 5 and FIG. 6. Additionally the Memory 1004 may contain a Rules table 1009, and Sessional Dependent rules 1010, which may be used by the connection programs 1008 and the API 1019, as discussed above. Optionally the Dynamic Sessional Proxy Server may include an inference engine 1021, which may implement determination of sessional dependent rules as described with respect to FIG. 9. The aforementioned programs and rules table may also be stored as data 1018 in a Mass Store 1018, such as a disk drive, CD-ROM drive, tape drive, flash memory, or the like.

The Dynamic Sessional Proxy 1001 may also include well-known support circuits, such as input/output (I/O) components 1007, power supplies (P/S) 1011, a clock (CLK) 1012, and cache 1013, which may communicate with other components of the system, e.g., via the bus 1005. The computing device may include a network interface 1014 to facilitate communication via an electronic communications network 1020, e.g., a local area network (LAN) or personal area network (PAN), via a suitable network protocol, e.g., Bluetooth, for a PAN. The Dynamic Sessional Proxy 1001 may also include a user interface 1016 to facilitate interaction between the system and a user. The user interface may include a monitor, Television screen, speakers, headphones or other devices that communicate information to the user.

The network interface 1014 may be configured to implement wired or wireless communication over local area networks and wide area networks such as the Internet. This allows the system 1000 to access remote devices, such as client devices or servers, and vice versa. The Proxy Server 1001 may send and receive data and/or requests for files via one or more message packets over the network 1020. Message packets sent over the network 1020 may temporarily be stored as part of the connection program 1008 in memory 1004. Additionally the dynamic sessional proxy may act as a relay sending the message packets received from client devices 1022 to other servers in the network 1020 such as the Master Server 1002 according to the dynamic sessional rules 1010 that may be located in a rules table 1009. The Dynamic Sessional Proxy 1001 may also receive message packets from a server such as a Master server 1002 and relay the message packets to a client device 1022. Optionally the Dynamic Sessional Proxy 1001 may receive dynamic sessional rules from a Master Server 1002 and the API may change or update the dynamic sessional rules 1010 in the rules table 1009 with the received rules.

The Dynamic Sessional redirection system 1000 may also include a (optionally) Master Server 1002 having one or more processor units 1033, which may be configured according to well-known architectures, such as, e.g., single-core, dual-core, quad-core, multi-core, processor-coprocessor, cell processor, and the like. The Master Server 1002 may also include one or more memory units 1034 (e.g., random access memory (RAM), dynamic random access memory (DRAM), read-only memory (ROM), and the like).

The processor unit 1033 may execute one or more programs, portions of which may be stored in the memory 1034 and the processor 1033 may be operatively coupled to the memory, e.g., by accessing the memory via a data bus 1035. The programs may include Network connection programs 1038 and (Optional) Inference Engine 1031, which may implement the method described above with respect to FIGS. 3 and 7. Additionally the Memory 1034 may contain a Sessional Dependent rules 1010 generated by the Inference Engine and resources 1032 which may be used by the connection programs 1008 and the Inference Engine 1019, as discussed above. Optionally the Dynamic Sessional Proxy Server may include an inference engine 1031, which may implement determination of sessional dependent rules as described with respect to FIG. 9. The aforementioned programs, session dependent rules and resources may also be stored as data 1048 in a Mass Store 1045, such as a disk drive, CD-ROM drive, tape drive, flash memory, or the like.

The Master Server 1002 may also include well-known support circuits, such as input/output (I/O) components 1037, power supplies (P/S) 1041, a clock (CLK) 1042, and cache 1043, which may communicate with other components of the system, e.g., via the bus 1035. The computing device may include a network interface 1044 to facilitate communication via an electronic communications network 1020, e.g., a local area network (LAN) or personal area network (PAN), via a suitable network protocol, e.g., Bluetooth, for a PAN. The Master Server 1001 may also include a user interface 1046 to facilitate interaction between the system and a user. The user interface may include a monitor, Television screen, speakers, headphones or other devices that communicate information to the user.

The network interface 1044 may be configured to implement wired or wireless communication over local area networks and wide area networks such as the Internet. This allows the system 1000 to access remote devices, such as client devices or servers, and vice versa. The Master Server 1002 may send and receive data and/or requests for files via one or more message packets over the network 1020. Message packets sent over the network 1020 may temporarily be stored as part of the connection program 1028 in memory 1004. Additionally the Master server may act as a resource server sending the resources in responses to requests from client devices 1022 received from proxy servers such as the Dynamic Sessional Proxy 1001. The Master Server 1002 may also send message packets containing session dependent rules to a proxy server such as a Dynamic sessional proxy 1001.

Aspects of the present disclosure provide for proxies with enhanced capabilities due to provision for dynamic reconfiguration and sessional capabilities. Dynamic reconfigurability allows for a proxies rules table to change without having to restart the proxy. The capability to handle two or more sessions enhances the versatility of the proxy, especially when used in conjunction with an inferencing engine.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method for redirecting data traffic, comprising:
   a) receiving a first request from a client device addressed to a first server;
   b) sending the first request to the first server;
   c) determining rerouting rules for data traffic between the client and the first server;
   d) receiving a response addressed to the client device from the first server;
   e) sending the response to the client device;
   f) receiving metadata from the client device, wherein the metadata provides information about a second request from the client device;
   g) receiving the second request from the client device addressed to the first server;
   h) comparing the information about the second request in the metadata to the rerouting rules wherein the rerouting rules specify sending the second request to a third server instead of the first server based on the metadata;
   i) sending the second request to the third server according the rerouting rules.

2. The method of claim 1 wherein the rerouting rules specify an optimal server for the request based on network congestion.

3. The method of claim 1, wherein the determining at c) includes dynamically changing one or more rerouting rules in a rules table.

4. The method of claim 1 wherein the metadata includes session information.

5. The method of claim 1 wherein the rerouting rules include one or more session-dependent rules.

6. The method of claim 1 wherein the rerouting rules include one or more application-dependent rules.

7. The method of claim 1 wherein the determining at c) further comprises receiving rerouting rules from the first server wherein the first server infers appropriate redirection rules for the client device from the first request.

8. The method of claim 1 wherein the determining at c) comprises examining the contents of the first request and inferring appropriate rerouting rules for the client device.

9. The method of claim 8 further comprising receiving contextual information from one or more servers and using the contextual information in the determining at c).

10. The method of claim 1 further comprising j) receiving a third request addressed to a third server and k) sending the third request to the third server and labeling the third request part of a second session.

11. The method of claim 10 further comprising l) determining rerouting rules for the second session and wherein subsequent requests determined to be part of the second session are redirected according to the redirection rules for the second session.

12. The method of claim 11 wherein the metadata includes session information.

13. The method of claim 11 wherein requests to other servers are defined as part of a new session.

14. The method of claim 1 further comprising k) receiving a server status message from the first server wherein the server status message indicates that the first server is down and changing the rerouting rules based on the server status message.

15. The method of claim 14 wherein the server status message includes a redirection rule, redirecting requests to a back-up server and wherein changing the rerouting rules includes writing a new rule to a rules table that directs requests to the back-up server.

16. A system for dynamic sessional redirection comprising:
   a processor;
   memory coupled to the processor;
   non-transitory instructions embedded in the memory that when executed cause the processor to carry out the method for dynamic sessional redirection comprising;
   a) receiving a first request from a client device addressed to a first server;
   b) sending the first request from the client device to the first server;
   c) determining rerouting rules for data traffic between the client and the first server;
   d) receiving a response addressed to the client device from the first server;
   e) sending the response to the client device;
   f) receiving metadata from the client device wherein the metadata provides information about a second request from the client device;
   g) receiving the second request from the client device addressed to the first server;
   h) comparing the information about the second request in the metadata to the rerouting rules wherein the rerouting rules specify sending the second request to a third server instead of the first server based on the metadata;

i) sending the second request to the third server according the rerouting rules.

17. The system of claim 16, further comprising an application programming interface configured to dynamically change one or more rerouting rules in a rules table in the memory.

18. The system of claim 16 wherein the metadata includes session information.

19. The system of claim 16 wherein the rerouting rules include one or more session-dependent rules.

20. The system of claim 16 wherein the rerouting rules specify an optimal server for the request based on network congestion.

21. The system of claim 16 wherein the determining at c) further comprises receiving redirection rules from the first server wherein the first server infers appropriate rerouting rules for the client device from the first request.

22. The system of claim 16 wherein the determining at c) comprises examining the contents of the first request and inferring appropriate rerouting rules for the client.

23. The system of claim 22 further comprising receiving contextual information from one or more servers and using the contextual information in the determining at c).

24. The system of claim 16 further comprising j) receiving a third request addressed to a third server and k) sending the third request to the third server and labeling the third request part of a second session.

25. The system of claim 24 further comprising l) determining rerouting rules for the second session and wherein subsequent requests determined to be part of the second session are redirected according to the rerouting rules for the second session.

26. The system of claim 25 wherein the metadata includes session information.

27. The system of claim 25 wherein requests addressed to the third server is defined as part of a new session and server wherein the addressed location is used to determine the session for the subsequent requests.

28. The system of claim 16 further comprising k) receiving a server status message from the first server wherein the server status message indicates that the first server is down and changing the redirection rules based on the server status message.

29. The system of claim 28 wherein the server status message includes a redirection rule, redirecting requests to a back-up server and wherein changing the rerouting rules includes writing a new rule to a rules table that directs requests to the back-up server.

30. Non-transitory instructions embedded in a computer readable medium that when executed by computer cause the computer to carry out the method for dynamic session redirection comprising:

a) receiving a first request from a client device addressed to a first server;

b) sending the first request from the client device to the first server;

c) determining rerouting rules for data traffic between the client and the first server;

d) receiving response addressed to client device from the first server;

e) sending response to client device;

f) receiving metadata from client device wherein the metadata provides information about a second request from the client device;

g) receiving the second request from the client device addressed to the first server;

h) comparing the information about the second request in the metadata to the rerouting rules wherein the rerouting rules specify sending the second request to a third server instead of the first server based on the metadata;

i) sending the second request to the third server according the rerouting rules.

* * * * *